June 11, 1957 C. P. McCLELLAND 2,795,145
WINDSHIELD WIPER DRIVE CABLE APPARATUS
Filed April 6, 1953 2 Sheets-Sheet 1

INVENTOR
Clarence P. McClelland
BY
Paul Fitzpatrick
ATTORNEY

June 11, 1957  C. P. McCLELLAND  2,795,145
WINDSHIELD WIPER DRIVE CABLE APPARATUS
Filed April 6, 1953  2 Sheets-Sheet 2

INVENTOR
Clarence P. McClelland
BY
Paul Fitzpatrick
ATTORNEY

United States Patent Office 2,795,145
Patented June 11, 1957

2,795,145

WINDSHIELD WIPER DRIVE CABLE APPARATUS

Clarence P. McClelland, Royal Oak, Mich., assignor to General Motors Corporation, Detroit, Mich., a corporation of Delaware Application April 6, 1953, Serial No. 346,949

3 Claims. (Cl. 74—70)

This invention relates to windshield wipers, and more particularly to windshield wiper cable drive apparatus.

In conventional windshield wiper drive apparatus for automobiles the windshield wiper motor is mounted in the engine compartment and is coupled to drive transmitting apparatus located within the body of the automobile on the opposite side of the firewall from the motor. In the apparatus in use at the present time the drive transmitting apparatus is supported by the drive shaft of the motor, and therefore, if it ever is necessary to remove the motor for repair or replacement, the drive apparatus also has to be removed and subsequently reassembled and readjusted when the windshield wiper motor is replaced. In addition, since the drive transmitting apparatus is supported by the motor drive shaft, it is not possible to assemble the drive transmitting apparatus inside the body before the motor is mounted in the engine compartment, and therefore, the conventionally used apparatus is not particularly well adapted for modern mass production assembly methods.

I have devised, and am herein disclosing and claiming, improved windshield wiper drive apparatus wherein the drive transmitting apparatus inside the automobile body is fixedly mounted on the inside surface of the firewall, and the wiper motor (which is in the engine compartment) is secured to and supported by the drive transmitting apparatus. With my improved apparatus the drive transmitting apparatus inside the body may be mounted on the firewall before the motor is mounted in the engine compartment, thereby greatly simplifying and expediting the assembly of the windshield wiper apparatus under modern mass production methods. Furthermore, should it become necessary to remove the motor for repair or replacement the drive transmitting apparatus inside the body need not be disturbed and the repaired motor or a new motor may be readily mounted without the necessity of removing or readjusting the drive transmitting apparatus inside the automobile body. As an additional advantage, different makes of wiper motors may be used interchangeably so long as the motor is provided with mounting means spaced at predetermined distances on opposite sides of its drive shaft, and it is not necessary to assemble the wiper motor and the drive transmitting apparatus as a single unitary kit, thus increasing the interchangeability of the parts and further adapting the windshield wiper apparatus to modern mass production methods of assembly.

Other features and advantages of the invention will be apparent from the following description and from the drawings in which.

Figure 1:
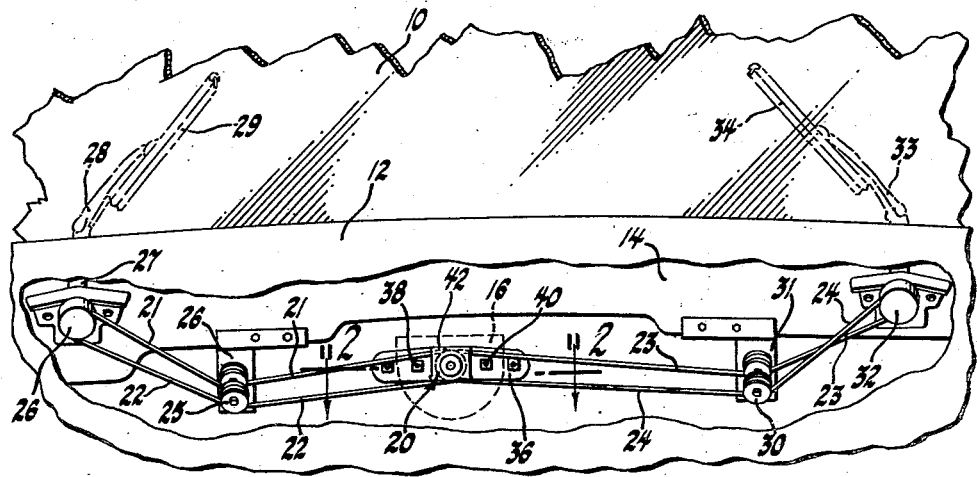
Fig. 1 is a fragmentary elevational view of the dash panel and windshield of an automobile, parts of the dash panel being broken away to show underlying structure.

Referring now more particularly to the drawings, apparatus incorporating the invention is illustrated as being installed in an automobile having a windshield 10 which is mounted above a dash panel 12 and a body firewall 14. Part of the dash panel is broken away in Fig. 1 to illustrate the windshield wiper drive apparatus. The windshield wiper motor 16 is located in the engine compartment forwardly of the firewall 14 and is provided with a drive shaft 18 which extends through an opening 19 in the firewall and is coupled to drive transmitting means designated generally at 20 in Figs. 1 and 2.

Referring to Fig. 1, the drive transmitting apparatus 20 operates wipers on opposite sides of the car through cables 21, 22, 23 and 24. The cables 21 and 22 pass over idler pulleys 25 which are mounted on a support bracket 26 on the firewall 14 and said cables make operative connection with a wiper output shaft (not shown) through a driven pulley or other connecting means in a housing 26. The wiper output shaft extends through a bearing sleeve 27 which is mounted in the firewall, and at its forward end the shaft carries a wiper arm 28 which mounts a windshield wiper blade 29.

At the other side of the car the construction is similar, the cables 23 and 24 passing over idler pulleys 30 which are supported on a bracket 31. The cables are crossed to provide for asymmetrical operation of the wipers at opposite sides of the car, and the cables make operative connection with a wiper output shaft by means of driven pulleys or other connecting means in a housing 32. At the outer end of the shaft is mounted a wiper arm 33 carrying a windshield wiper blade 34.

As pointed out above, in the past the motor 16 has been mounted directly on the automobile firewall and the motor drive shaft 18 supported the drive transmitting means 20 so that in the event the motor was removed it was necessary also to remove the drive transmitting means 20.

According to the present invention, the drive transmitting means 20 is fixedly mounted on the inner surface of the firewall 14 by means of a support bracket 36 on which the motor is mounted so that the drive transmitting means is completely independent of the motor, and the motor may be removed without disturbing the drive transmitting means.

Figure 2:
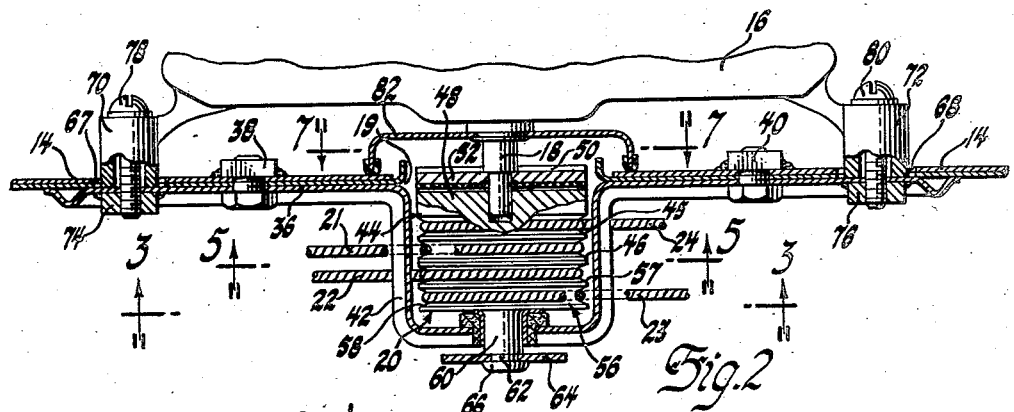
Fig. 2 is a fragmentary horizontal sectional view of a portion of the apparatus of Fig. 1 on an enlarged scale, taken along the line 2—2 of Fig. 1.
Figure 3:
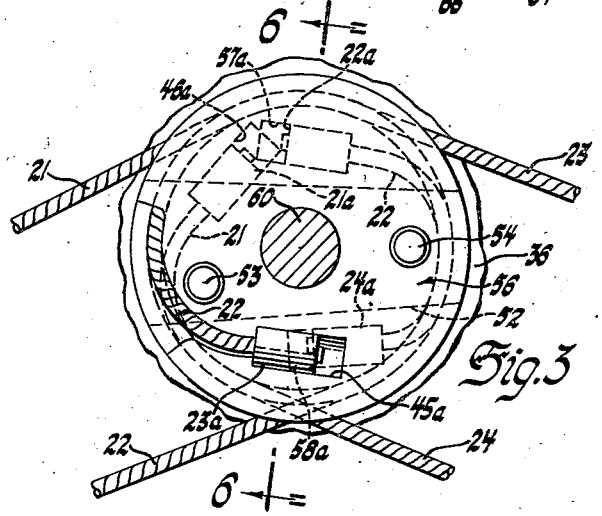
Fig. 3 is a section through the housing for the drive transmitting means taken along the line 3—3 of Fig. 2.
Figure 4:
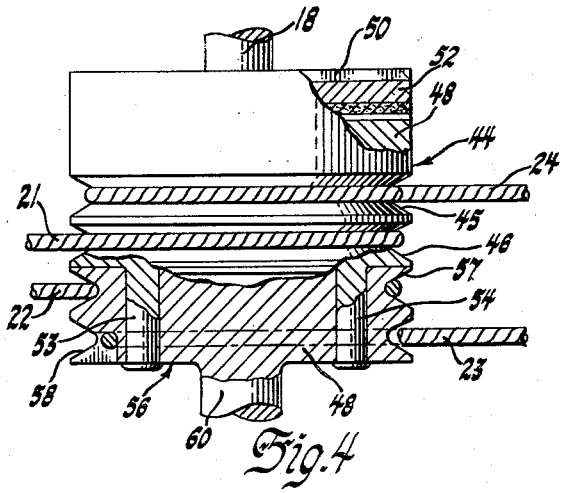
Fig. 4 is a plan view, partly in section, through the drive transmitting apparatus.

As shown in Figs. 1 and 2, a support bracket 36 is fixedly secured to the inner surface of the firewall 14 by means of screws 38 and 40. Bracket 36 is formed with an integral cup-shaped portion 42 forming a housing for the drive transmitting means 20, which may comprise an oscillatable arm having cable connecting fingers of the general type illustrated in my copending application Serial No. 196,268, filed November 17, 1950 (now Patent 2,660,894), or which may comprise pulley means as illustrated herein. In any event, the drive transmitting means 20 is secured to the support bracket 36 in the housing 42, and while the drive transmitting means 20 is oscillatable or rotatable in the housing 42, said means is mounted in the housing so that it will not fall out of the housing before assembly of the apparatus and before the support bracket 36 is mounted on the firewall.

The purpose of mounting the drive transmitting means 20 in the housing 42 is to facilitate assembly of the apparatus under modern mass production methods. The sub-assembly, including the drive transmitting means 20 and the support bracket 36, may be manufactured and assembled without the motor 16, and this sub-assembly may be conveyed to the assembly line and mounted in the automobile body before the motor is mounted in the engine compartment. In order to prevent the sub-assembly, including the support bracket 36 and the drive transmitting means 20, from falling apart before it is mounted, means are provided for securing the drive transmitting means to the bracket 36 for oscillation in the housing 42.

Figure 7:
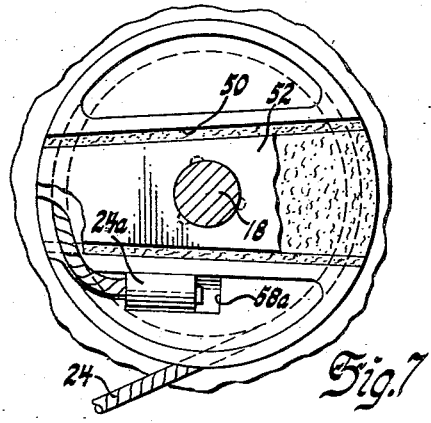
Fig. 7 is a section taken in the engine compartment along the line 7—7 of Fig. 2.
Figure 6:
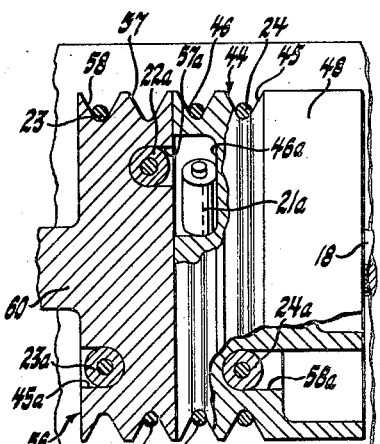
Fig. 6 is a section through the housing taken along the line 6—6 of Fig. 3.

The drive transmitting means illustrated comprises a pulley assembly, the construction of which is shown best in Figs. 3 to 6, and which comprises an inner pulley designated generally at 44 and having two pulley grooves 45 and 46 which support the cables 21 and 24. Extending inwardly on the pulley 44 is a hub 48 in which is formed a diametric slot 50 which is tapered or wedge shaped when viewed in transverse section, as shown in Fig. 7. The drive shaft 18 is fitted at its free end with a tapered key 52 which fits into the slot 50 to provide a removable coupling between the motor 16 and the drive transmitting means 20. Posts 53 and 54 (Fig. 4) project from the opposite face of the pulley 44, and the second pulley, designated generally at 56, is mounted on these posts, the ends of the posts being peened to secure the pulleys 44 and 56 together. The second pulley 56 is provided with pulley grooves 57 and 58 in which cables 22 and 23 ride.

As shown in Figs. 3, 5, 6 and 7, the pulleys are provided with recesses in which the ends of the cables are anchored before the pulleys are assembled. The cable 21 extends into a recess 46a and has secured to its end an anchor device 21a; the cable 22 extends into a recess 57a and has secured to its end an anchor device 22a; the cable 24 extends into a recess 45a and has secured to its end an anchor device 23a; and the cable 23 extends into a recess 58a and has secured to its end an anchor device 24a.

From the rear face of the second pulley 56 a hub 60 projects through an opening in the base wall of housing 42. The free end of the hub 60 has a portion 62 of narrow diameter which mounts a retaining washer 64, the washer being retained on the hub by means of staking, as shown at 66 in Fig. 2.

Figure 5:
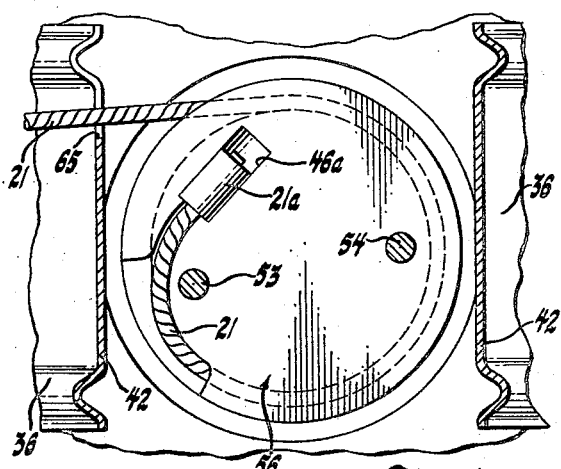
Fig. 5 is a section through the housing for the drive transmitting means taken along the line 5—5 of Fig. 2.

With this construction, the pulleys 44 and 56 may be assembled with the cables 21—24, and the assembly can be nonremovably mounted in the housing 42, openings as shown at 65 in Fig. 5 being provided in the walls of the housing for the cables to pass through. The sub-assembly, including the support bracket 36 and the drive transmitting means 20, may then be mounted on the inner surface of the automobile firewall 14 by means of screws 38 and 40, and the motor 16 may subsequently be mounted on the support bracket 36. As shown in Fig. 2, openings 67 and 68 are provided in the firewall at opposite sides of the drive shaft opening, and the motor is secured directly to the bracket 36, spacers 70 and 72 being provided to space the motor forwardly of the firewall 14. Preferably nuts 74 and 76 are welded on the inner surface of the bracket 36, and bolts 78 and 80 pass through openings in the bracket and are threaded into respective nuts 74, 76 to secure the motor 16 to the bracket 36. The motor does not support the drive transmitting means 20, and in the event it is necessary to remove or replace the motor, it is not necessary to remove or adjust the drive transmitting means. A dust cup 82 is carried by the motor to seal the drive shaft opening 19. The complementary asymmetrical or wedge shape of the slot 50 in the pulley assembly and the key 52 on the drive shaft 18 insures proper assembly when the motor is coupled to the drive transmitting means.

Figure 8:
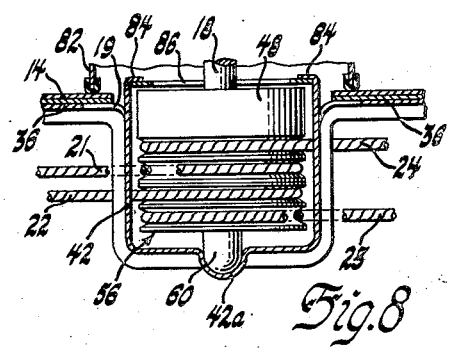
Fig. 8 is a section similar to a portion of Fig. 2, but showing a modified form of the invention.

Fig. 8 shows a modified form of the invention in which the drive transmitting means is nonremovably mounted in a different manner in the support bracket housing. In Fig. 8 the structure is generally the same as in Fig. 2, and will not again be described in detail. However, the hub 60 of the pulley 56 does not extend through an opening in the housing 42, but said hub rests in a bearing recess 42a formed in the center of the base wall of the housing 42. Tabs 84 are struck from the support bracket 36, and are bent over as illustrated to hold the pulley assembly rotatably within the housing 42. A spring washer 86 may be provided between the tabs 84 and the pulley hub 48 to insure against the pulley assembly falling out of the housing.

While I have shown and described two embodiments of my invention, it is capable of many modifications. Changes, therefore, in the construction and arrangement may be made without departing from the spirit and scope of the invention as set forth in the appended claims.

I claim:

1. In a vehicle having a body wall, windshield wiper cable drive means comprising, a support bracket having an integral housing portion provided with cable admitting openings therein, drive transmitting means oscillatably supported by said bracket within said housing portion thereof, means mounting said bracket to one side of said body wall, cable means on said drive transmitting means extending through said openings, wiper motor means located on the other side of said body wall, means removably coupling said motor means to said drive transmitting means, and means extending through said body wall from said bracket to said motor means for securing said motor means to said bracket and comprising the sole support of said motor means.

2. In a vehicle having a body wall, windshield wiper drive apparatus comprising, a support bracket having a housing portion formed with openings for receiving drive means therethrough, drive transmitting means oscillatably supported by said bracket within the housing portion thereof, means mounting said bracket on one side of said body wall, drive means connected to said drive transmitting means and extending through said openings, wiper motor means located on the other side of said body wall, means removably coupling said motor means to said drive transmitting means, and means extending through said body wall from said bracket to said motor means for securing said motor means to said bracket and comprising the sole support of said motor means.

3. In a vehicle having a body wall, windshield wiper cable drive means comprising, a support bracket having a housing portion formed with at least one cable admitting opening therethrough, pulley means oscillatably supported by said bracket within the housing portion thereof, means mounting said bracket on one side of said body wall, cable drive means connected to said pulley means and extending through said opening, wiper motor means located on the other side of said body wall, means removably coupling said motor means to said pulley means, and means extending through said body wall from said bracket to said motor means for securing said motor means to said bracket and comprising the sole support of said motor means.

References Cited in the file of this patent

UNITED STATES PATENTS

| | | |
|---|---|---|
| 1,825,426 | Shippy | Sept. 29, 1931 |
| 2,046,171 | Lauer | June 30, 1936 |
| 2,194,045 | Kvarnstrom | Mar. 19, 1940 |
| 2,516,808 | Seger | July 25, 1950 |
| 2,547,285 | Rappl | Apr. 3, 1951 |
| 2,572,750 | Oishei | Oct. 23, 1951 |
| 2,586,567 | Scheele | Feb. 19, 1952 |
| 2,593,355 | Sivacek | Apr. 15, 1952 |
| 2,613,544 | Cullman | Oct. 14, 1952 |
| 2,617,315 | McClelland | Nov. 11, 1952 |
| 2,624,904 | Wianco | Jan. 13, 1953 |
| 2,651,801 | Horton | Sept. 15, 1953 |